US000001910H

United States Statutory Invention Registration [19]

[11] Reg. Number: H1,910

Clutter et al.

[45] Published: Nov. 7, 2000

[54] RUBBER TIRED CARRIER

[75] Inventors: Ronald W. Clutter, Geneva; Kenneth J. Chlad, Chagrin Falls; Timothy L. Cooper, Marion, all of Ohio

[73] Assignee: Caterpillar Inc., Peoria, Ill.

[21] Appl. No.: 08/813,670

[22] Filed: Mar. 7, 1997

[51] Int. Cl.[7] ..... B62D 55/00

[52] U.S. Cl. ..... 180/9.48; 180/24.02; 180/24.07

[58] Field of Search ..... 180/9.48, 24.02, 180/24.07, 209, 22, 308; 301/5.1

[56] References Cited

U.S. PATENT DOCUMENTS

| | | | |
|---|---|---|---|
| Re. 34,289 | 6/1993 | McClain et al. . | |
| 1,748,198 | 2/1930 | Van Wormer | 301/5.1 |
| 2,083,327 | 6/1937 | Ekseregian | 301/5.1 |
| 3,224,529 | 12/1965 | Gandolfo . | |
| 3,393,758 | 7/1968 | Helm et al. | 180/9.48 |
| 3,580,403 | 5/1971 | Lancashire . | |
| 3,749,193 | 7/1973 | Blase et al. | 180/9.48 |
| 3,899,038 | 8/1975 | Griffith et al. | 180/9.48 |
| 3,907,055 | 9/1975 | Bertram et al. | 180/9.48 |
| 3,961,429 | 6/1976 | Brown . | |
| 3,998,286 | 12/1976 | Ponikelsky et al. . | |
| 4,088,236 | 5/1978 | Moore . | |
| 4,210,219 | 7/1980 | Oswald et al. . | |
| 4,225,191 | 9/1980 | Knoski | 301/5.1 |
| 4,341,276 | 7/1982 | Furuichi | 180/9.48 |
| 4,392,769 | 7/1983 | Lowery . | |
| 4,664,791 | 5/1987 | McClain et al. . | |
| 5,018,591 | 5/1991 | Price | 180/9.48 |
| 5,290,133 | 3/1994 | Riley . | |
| 5,295,317 | 3/1994 | Perrott . | |
| 5,598,896 | 2/1997 | Haest | 180/9.48 |
| 5,848,664 | 12/1998 | Kaspar | 180/308 |

OTHER PUBLICATIONS

Advertisement from Jan., 1996, "Peerless Scrap Loaders."
"Tor Truck Corporation Repot," Issue 2, 1992.
"M318 Wheeeled Excavator," date unknown.
Caterpillar, "350 MH Wheeled Carrier," brochure, 1996.
"Technical Description Hydralic Excavator A 932," Feb., 1991.

*Primary Examiner*—Harold J. Tudor
*Attorney, Agent, or Firm*—Fay, Sharpe, Beall, Fagan, Minnich & McKee, LLP

[57] ABSTRACT

A wheeled carrier adaptable for use with material handling equipment comprises a main body and first and second frames adjustably connected to the main body portion. Wheel assemblies are connected to the frames. The width of the carrier is adjustable so the carrier can be easily transported yet provide sufficient stability when used in material handling applications.

15 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RUBBER TIRED CARRIER

BACKGROUND OF THE INVENTION

This invention relates to an improved rubber tired carrier for use in connection with material handling systems. More particularly, the invention is directed to a rubber tired carrier having an adjustable width. Adjustability is advantageous inasmuch as the carrier is easily transported when the width is narrowed yet the carrier provides sufficient stability to the system when the width is expanded in material handling applications.

While this invention is particularly directed to the art of material handling, and will thus be described with specific reference thereto, it will be appreciated that the invention may have usefulness in other fields and applications. For example, the invention may also have usefulness in connection with earthmoving equipment—such as cranes and dozers—and snow removal equipment.

A wide variety of material handling systems are known. These systems use a carrier—two types of which are typical—to support the machine/equipment actually used to handle material or scrap.

The first type of carrier is a rubber tired carrier. Rubber tired carriers are useful in situations where transporting machinery to and from job sites is necessary. This is because rubber tired carriers generally have a width narrow enough to comply with highway standards and have conventional wheel and axle assemblies as well as conventional steering mechanisms. When such a system, though, is being used to handle materials, the wheel base of the rubber tired assemblies is alone too narrow to provide sufficient stability. Consequently, separate outriggers which extend from the carrier are utilized. Sufficient lateral stability is thus provided to the carrier because an effective width greater than the wheel base of the rubber tired assemblies is created by the outriggers. Depending on the circumstances of use, the outriggers vary in size and strength.

In addition, known rubber tired carriers have axles which limit maneuverability and suspension systems which cause rocking when the carrier is moving from one location to another. This is especially troublesome when the carrier is moving and carrying a heavy load because the rocking becomes increasingly exaggerated and could cause tipping of the carrier.

The second type of carrier used is a crawler track carrier. Crawler tracks are useful in some applications but have limited adaptability. For example, crawler tracks provide good stability, skid steering, and improved traction over conventional tired assemblies. However, a crawler track design is not conducive to on-road transport situations.

Further, known track style carriers typically utilize a drive sprocket and an idler sprocket. The idler sprocket is the sprocket that usually is recommended by manufacturers to carry larger loads. Thus, the operator must always be aware of the orientation of the carrier so that the bulk of the load can be positioned over the idler sprocket instead of the drive sprocket.

Recently, regulations have been enacted requiring that scrap yards utilize asphalt or concrete pavement instead of gravel or dirt. As a result, both of the above-referenced types of carriers have become difficult to use in scrap yard applications. More specifically, rubber tired carriers utilizing outriggers do not operate well on concrete or asphalt because, when the outriggers are in use, the load is concentrated on only four points thus causing cracking of the underlying pavement or embedding of the outriggers therein. The crawler track design is also not desirable because the tracks can tear up and cause damage to hard surfaces such as asphalt or concrete.

The present invention contemplates an improved rubber tired carrier which resolves the above-referenced difficulties and others.

SUMMARY OF THE INVENTION

A wheeled carrier adaptable for use with material handling equipment is provided. In accordance with one aspect of the invention, first and second frame portions are adjustably connected to a main body portion.

In accordance with another aspect of the invention, first and second wheel and drive assembly sets are mounted to the first and second frame portions, respectfully.

In accordance with another aspect of the invention, the first and second wheel and drive assembly sets operate using skid steering principles.

In accordance with another aspect of the invention, the carrier, when expanded, has a generally square configuration.

In accordance with another aspect of the invention, chain drive assemblies are provided to the tire assemblies of each side of the carrier.

In accordance with another aspect of the invention, mechanical link assemblies are provided to the tire assemblies of each side of the carrier.

A principal advantage of the present invention is that the first and second frame portions —and thus the first and second wheel and drive assembly sets—are adjustable relative to one another to effectively expand or narrow the overall width of the carrier. This feature allows the carrier to be transportable yet still provide sufficient width for stability during use.

Another advantage of the present invention is that the skid steering feature facilitates mobility and tight turning radii.

Another advantage of the present invention is that the expanded, generally square configuration—in relation to the overall length and width of the base platform —allows for 360° uniform lifting capacity.

Another advantage of the present invention is that the expanded, generally square configuration allows for more convenient positioning of the carrier prior to picking material.

Another advantage of the present invention is that the expanded carrier allows for uniform lifting capabilities and increased stability when maneuvering in scrap yards.

Another advantage of the present invention is that no outriggers are necessary so the load of the system is distributed to six wide tires instead of four outriggers. This creates less ground pressure and enhances stability.

Another advantage of the present invention is that the configuration of the carrier allows an operator to move from scrap pile to scrap pile with better efficiency than the operator would experience with conventional designs.

Another advantage of the present invention is that no axles are used so maintenance is decreased and fewer parts are necessary.

Another advantage of the present invention is that the design is simple in that conventional operator controls typically used in a standard track style vehicle are used. No modifications such as those required in the steering systems of known vehicles are needed.

Another advantage of the present invention is that in at least one embodiment the tire assemblies are mounted directly to drive motors such that access and removal of wheel and drive assemblies is simple thus reducing maintenance and down-time when compared to standard axle style carriers.

Another advantage of the present invention is that the rubber tire assemblies are conveniently rotatable.

Another advantage of the present invention is that no suspension springs are used so no unnecessary rocking of the carrier occurs.

Another advantage of the present invention is that because the tire assemblies on a side of the carrier, i.e. in a wheel and tire assembly set, are linked to one another by a chain drive assembly or a mechanical link assembly, full power can be provided to a single tire assembly if the other two tire assemblies become elevated off of the ground.

Another advantage of the present invention is that is that equal load can be experienced by the front and the back of the carrier because of the use of individual drive assemblies for each tire as opposed to a drive sprocket and an idler sprocket that are used with known rubber tired carriers.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent those skilled in the art.

DESCRIPTION OF THE DRAWINGS

The present invention exists in the construction, arrangement, and combination of the various parts of the device, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
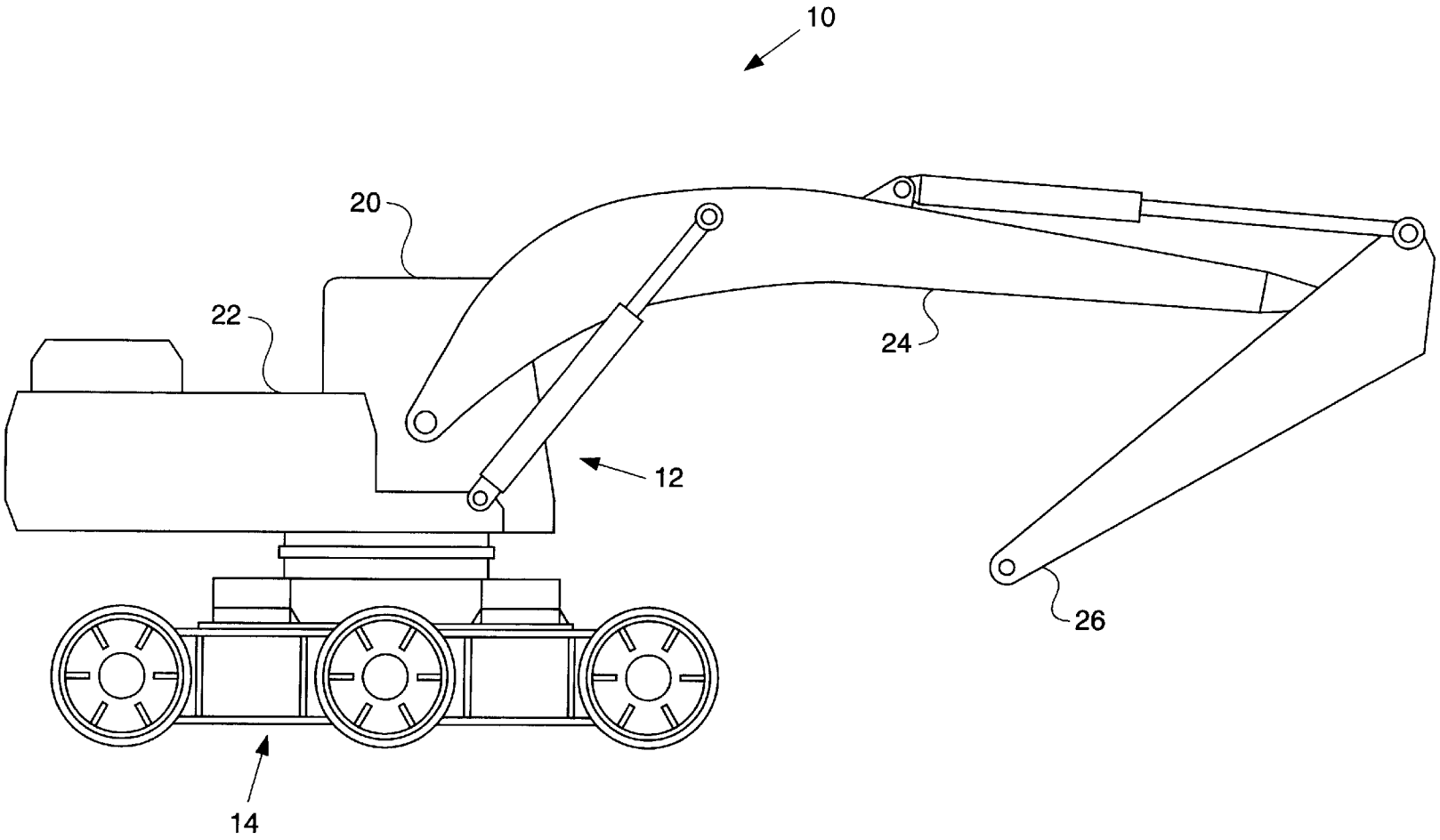
FIG. 1 is a side elevational view of a material handling system incorporating the preferred embodiment of the invention.

Referring now to the drawings wherein the showings are for purposes of illustrating the preferred embodiments of the invention only, and not for purposes of limiting same, FIG. 1 provides a view of the overall preferred embodiment incorporated in an exemplary material handler 10. As shown, the materials handler 10 contains an upper 12 and a wheeled carrier 14. It is to be appreciated, however, that the material handler may take other suitable forms.

The upper 12 includes a cab unit 20, to accommodate the controls and the operator, and an engine unit 22. The upper 12 is further provided with a material handling linkage 24 which extends from the cab unit 20 and the engine unit 22 to facilitate material handling. It is to be appreciated that the linkage could have a variety of accessories attached to an end 26 thereof to facilitate handling of a variety of different materials. As those skilled in the art will appreciate, these accessories may include magnets, claws, shovels, buckets, forks, etc. Other suitable accessories could be used depending on the circumstances.

Figure 2:
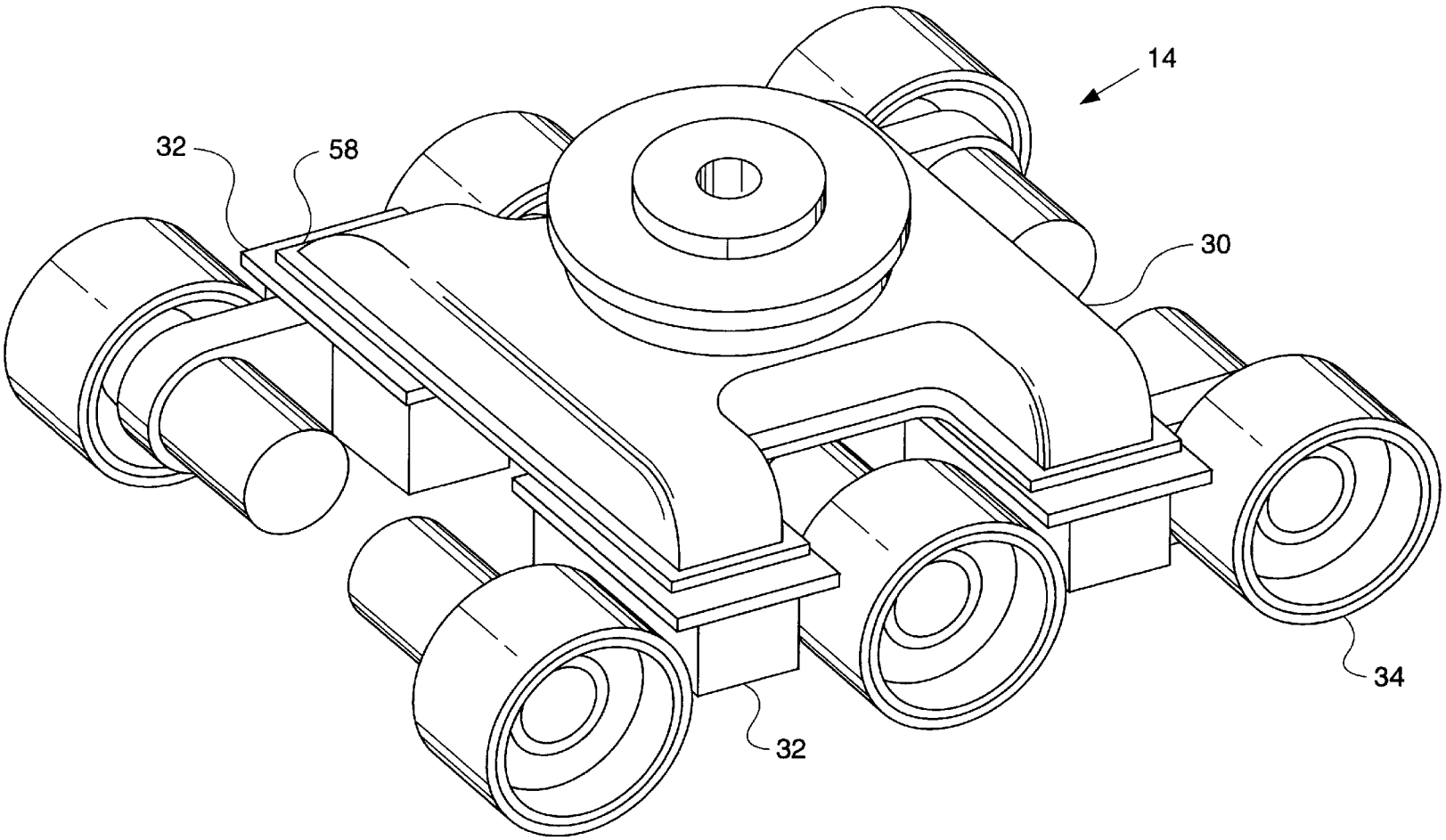
FIG. 2 is a perspective view of a wheeled carrier according to the present invention.

Referring now to FIG. 2, the wheeled carrier 14 comprises a carbody, or main body, 30 and propel frames 32 adjustably connected to the car body 30. The propel frames 32 support the wheel and drive assemblies 34. As shown, in the preferred embodiment, six (6) wheel and drive assemblies are utilized, sets of three (3) such assemblies being mounted on each frame 32.

Figure 3:
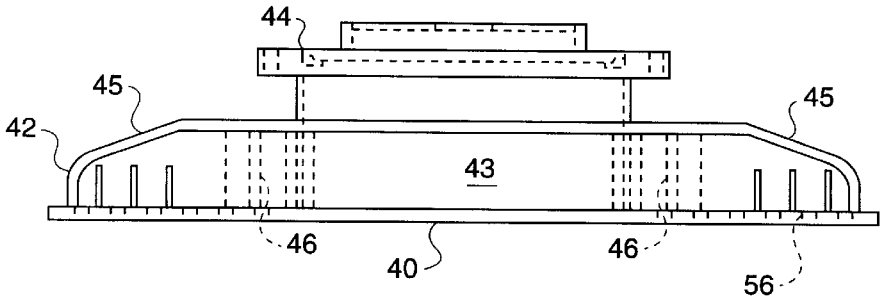
FIG. 3 is a side view of a carbody of the carrier of FIG. 2.
Figure 4:
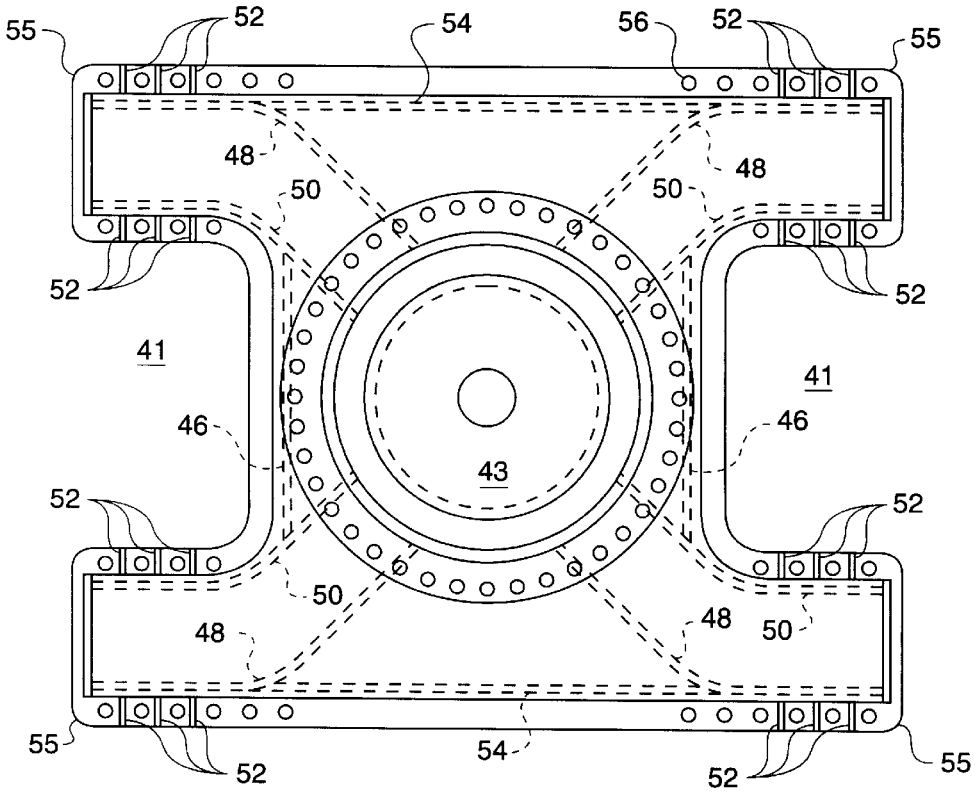
FIG. 4 is a top view of the carbody of carrier of FIG. 2.

FIGS. 3 and 4 show that the carbody 30 has a bottom plate 40 that is generally square or rectangular in configuration but has generally rectangular cut outs 41. This configuration represents a standard "X" carbody design. Carbody 30 also includes a top plate 42 that corresponds to the X shape of the bottom plate 40 and also has an aperture 43 formed therein to accommodate a hub 44. The top plate 42 has edges shaped to conform to the peripheral edges of the bottom plate 40 and has curved outer portions 45 to create the dome-like shape of the top plate 42.

The carbody 30 is reinforced by side plates 46, long ribs 48, short ribs 50, gussets 52, and front plates 54. The long and short ribs 48, 50 extend from the aperture 43 of the top plate 42 to extensions 55 which are formed in the top and bottom plates 40, 42 as a result of cut-outs 41 being formed in the bottom plate 40.

Also shown in FIGS. 3 and 4 are adjustment apertures, exemplary shown at 56, which are positioned on the extensions 55 and extend through the bottom plate 40. These apertures are aligned to facilitate convenient width adjustment of the carrier 14, as will be more particularly described below. It should be recognized that suitable fastening mechanisms (representatively shown at 58 in FIGS. 2, 11, 12 and 14) such as nut and bolt are selectively inserted in the apertures as will also be described below.

Figure 5:
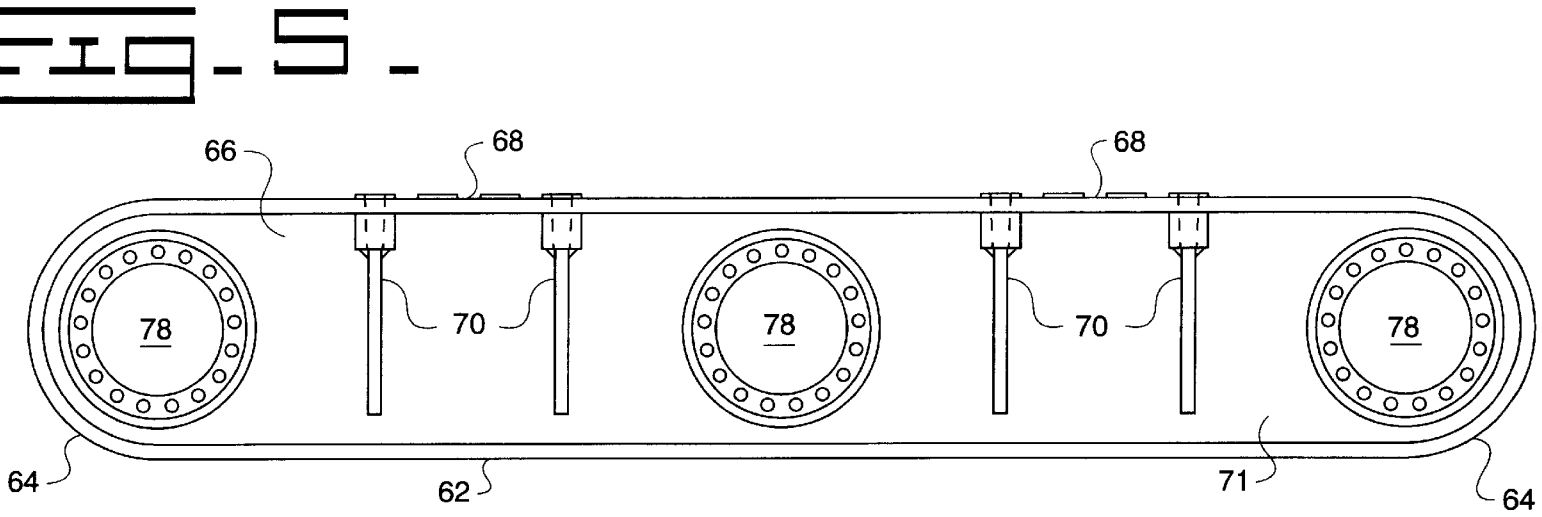
FIG. 5 is a side view of a propel frame of the carrier of FIG. 2.
Figure 6:
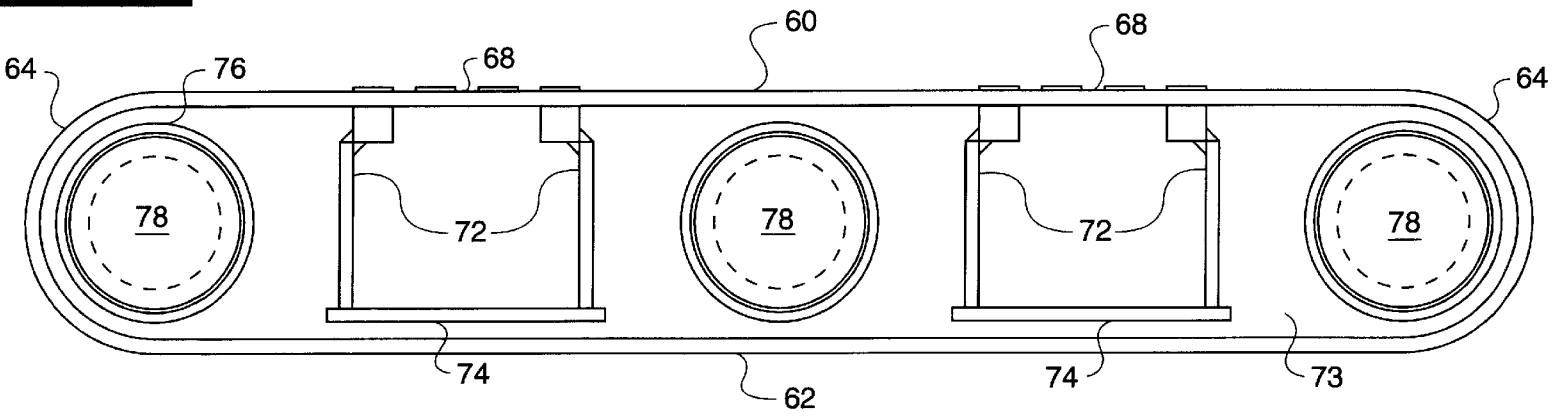
FIG. 6 is another side view of the propel frame of FIG. 5.
Figure 7:
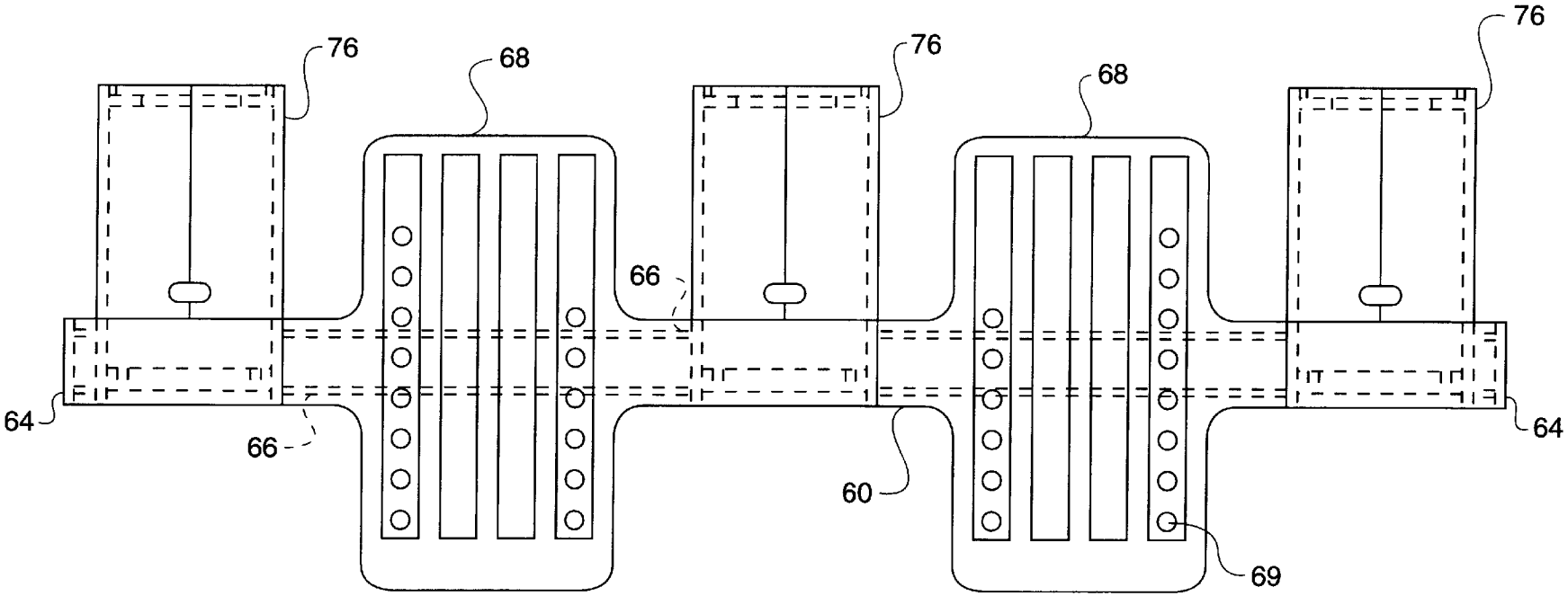
FIG. 7 is a top view of the propel frame of FIG. 5.

FIGS. 5–7 show one of the propel frames 32. It is to be appreciated that the carrier 14 of the preferred embodiment has two propel frames which each accommodate three wheel and drive assemblies. This configuration is similar to crawler tracks in that skid steering principles are used to maneuver the handler 10. Skid steering—which is implemented in the preferred embodiment through known techniques and equipment—improves maneuverability and facilitates mobility and tight turning radii.

As shown, the propel frame includes a top plate 60, a bottom plate 62, and end plates 64. The plates 60, 62, and 64 define an oblong frame which has positioned therein side plates 66. Extending from the top plate 60 are two adjustment plates 68. The adjustment plates 68 are generally rectangular in configuration and have formed therein apertures, exemplary shown at 69, which correspond to and can be aligned with the apertures 56 formed in the carbody 30. Suitable fastening mechanisms 58 (representatively shown in FIGS. 2, 11, 12 and 14) are selectively inserted in the apertures 56 and 69 to secure the carbody and the frames together as shown, for example, in FIGS. 2, 11, 12 and 14. The adjustment plates 68 extend generally perpendicularly from a longitudinal direction of the side plates 66 and are supported by triangular gussets 70 on an outer side 71 (FIG. 5) and by rectangular gussets 72 on an inner side 73 (FIG. 6). The rectangular gussets 72 are further connected by a bottom weldment 74.

In addition, cylinders 76 are positioned in and extend from the side walls 66 to accommodate the wheel and drive assemblies 34. Suitable openings 78 are formed in the side walls 66 in order to accommodate the cylinders 76.

Figure 8:
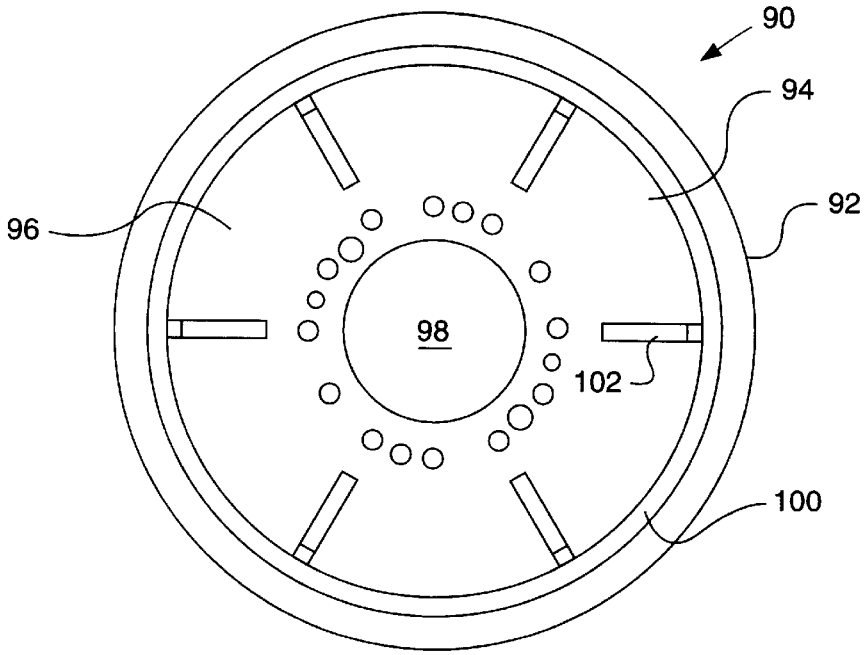
FIG. 8 is a side view of a wheel/tire assembly used in connection with the carrier of FIG. 2.
Figure 9:
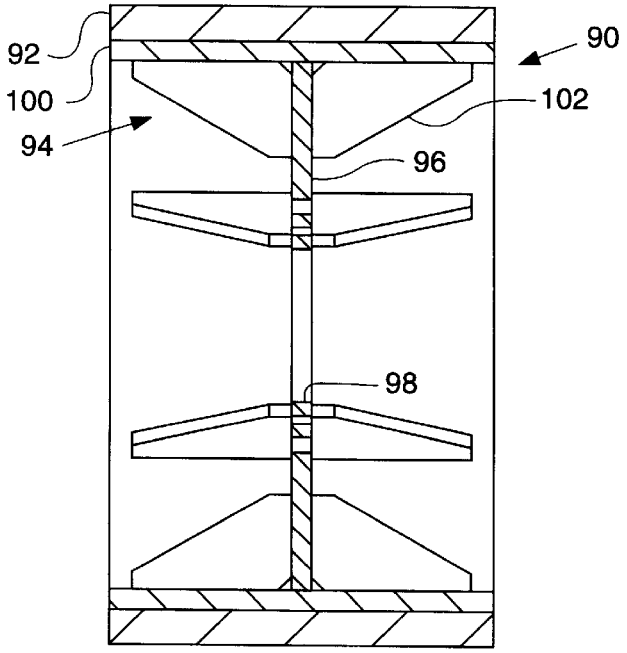
FIG. 9 is a cross-sectional view of the assembly of FIG. 8.

Referring now to FIGS. 8–9, a wheel/tire assembly 90 of a wheel and drive assembly 34 is shown. The assembly 90 includes rubber or elastomer material 92 formed around and/or mounted on rim 94. The rim 94 includes circular rim plate 96 having a rim aperture 98 formed therein to accommodate a hub. A rim cylinder 100 which has the rim plate 96 positioned therein is provided to support the material 92. Generally triangular gussets 102 extend from the cylinder 100 to the plate 96 and provide additional support for the wheel/tire assembly 90.

Figure 10:
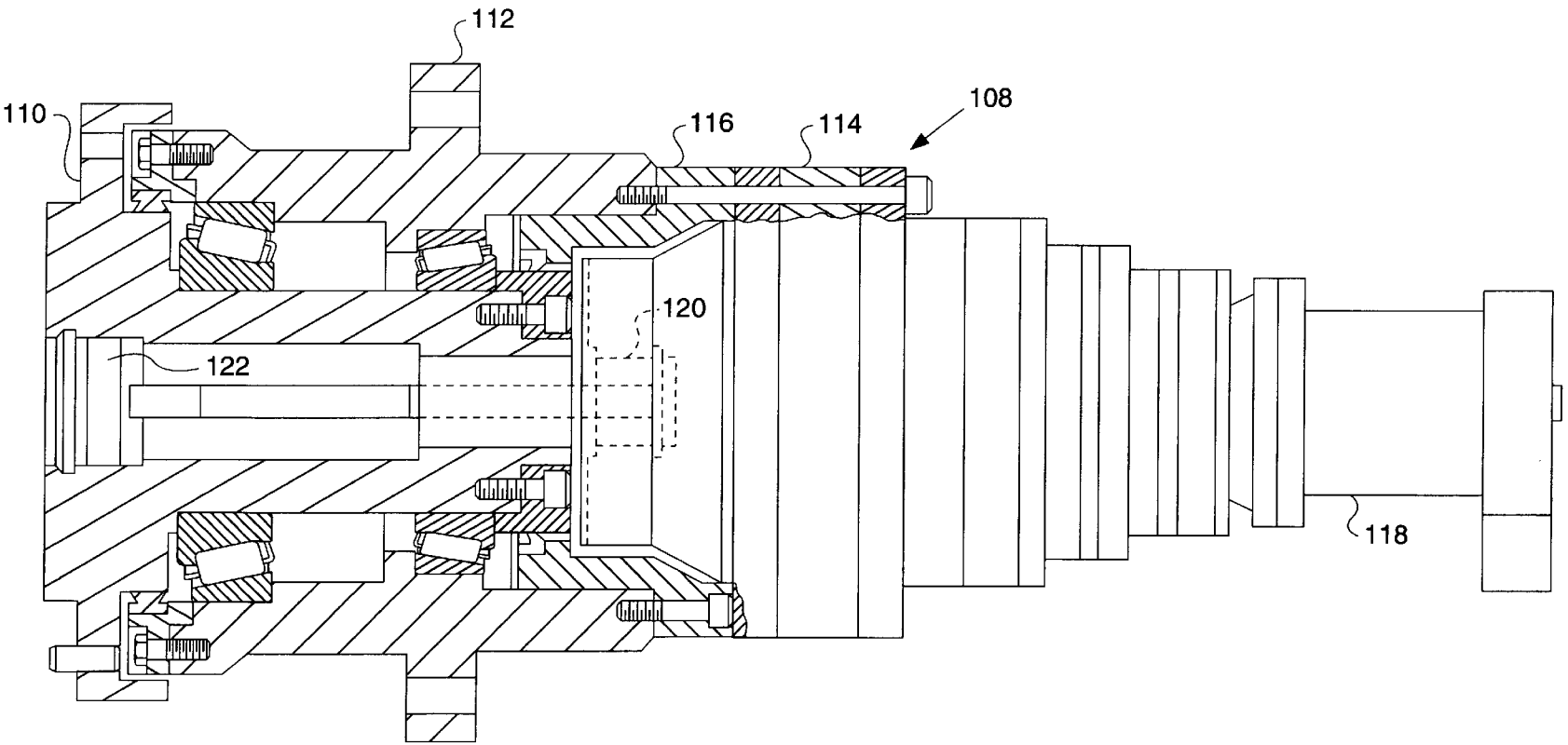
FIG. 10 is a partial cross-sectional view of a drive assembly used in connection with the carrier of FIG. 2.

The wheel/tire assembly 90 is rotatably mounted to a drive assembly 108 shown in FIG. 10 to form the wheel and drive assembly 34. The rim is connected to a hub 108 with suitable connectors. Specifically, the drive assembly 108 includes the hub 110 which is rotatably mounted within a wheel housing 112. A gear case 114 is connected to the wheel housing 112 through gear case adapter 116. A hydraulic motor 118 is connected to the gear case 114 and a stub shaft 120 connects the gear case 114 to the hub 110. The hub 110 is also provided with a stub shaft retainer 122.

The preferred configuration of the wheel and drive assembly is advantageous. For example, no axles are used so maintenance is decreased, fewer parts are necessary, and suspension systems that could cause undesired rocking are eliminated. In addition, because the wheels/tires are directly mounted to respective drive motors, access and removal of the tires and drive assemblies is fairly simple as compared to standard axle driven configurations. The positioning and configuration of the tires also make such tires conveniently rotatable.

The preferred drive assembly scheme may be adapted to include a variety of motor arrangements. As noted above, a motor may be provided for each wheel and drive assembly. However, if these motors do not produce sufficient power, the wheel and drive assemblies may be linked together as will be hereafter described. Alternatively, a single, large drive motor for each wheel and drive assembly set (two total for a typical carrier) and mechanisms, such as bars or chains, may be used to transfer drive energy to the tire assemblies. Such a configuration could also include other suitable mechanisms to transfer energy to the tire assemblies. In a similar manner, two motors per side may be implemented along with suitable linkages. Still further, one motor may be provided to each side that is not in line with the wheel. In this case, the motor and wheel sprockets would be of a different pitch to vary the maximum speed of the material handler.

Once assembled, the carrier 14 can be adjusted using a known technique that is used in connection with track style vehicles so that the width of the carrier is changed. More specifically, when the carrier 14 is to be put to use in material handling applications, the position of the carbody 30 relative to the propel frames 32 is adjusted by rotating the upper 12 to a side of the carrier 10 and manipulating the extension 24 to lift the weight of the upper off of that side of the carrier 10. The fasteners 58 are removed from the apertures 56 and 69 and a lift truck (not shown) is then used to pull the propel frame 32 outwardly to a desired position. The fasteners 58 are then reinserted in appropriate apertures to secure the propel frame 32 in the selected position. This process is repeated on the opposite side of the carrier 10 to produce the configuration shown in FIG. 11. This generally square configuration provides increased stability to the system as a whole.

That is, the square design when the carrier is in an expanded state allows for uniform lifting capacity through 360° of rotation of the material handler upper. Accordingly, outriggers are not needed.

Figure 12:
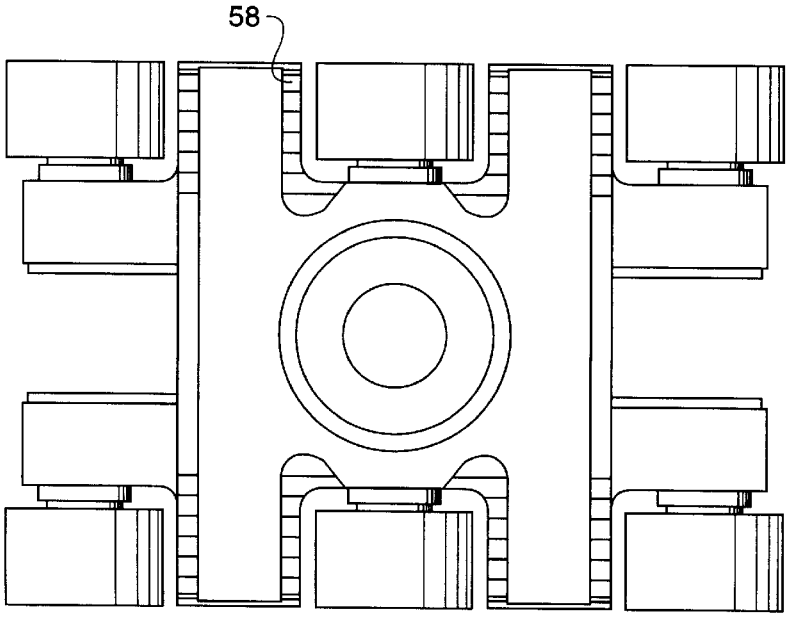
FIG. 12 is a view of the carrier of FIG. 2 in a non-expanded state.

For purposes of transport and storage, the apertures 56 and 69 can be realigned using the above described process to narrow the width of the overall carrier 14 by sliding the propel frames 32 inwardly with respect to the carbody 30 to produce a configuration shown in FIG. 12. The fasteners 58, of course, can then be selectively replaced in the apertures to secure the selected position.

As an alternative to using the above described process to move the propel frames relative to the carbody, a power-assisted system could be provided to the propel frames in order to facilitate such movement. For example, cylinders (hydraulic or electronic), jacks, and/or worm screws could be suitably used.

Figure 11:
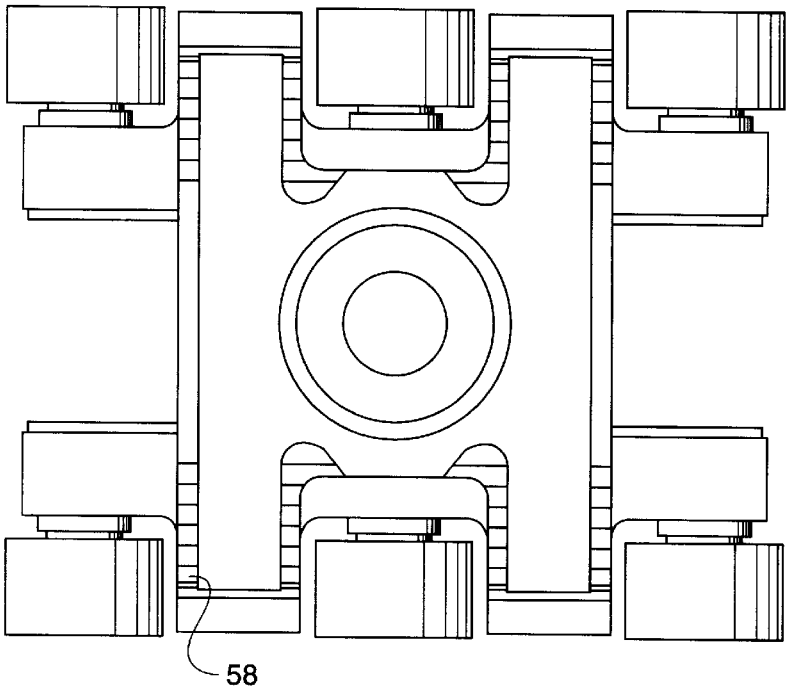
FIG. 11 is a top view of the carrier of FIG. 2 in an expanded state.

It is to be recognized that FIGS. 11 and 12 show only two (2) of a plurality of different configurations of the relative positions of the frames 32 and carbody 30. A variety of other configurations are possible and may be implemented as desired or allowed by the circumstances of use.

The fasteners used in the preferred embodiment are nut and bolt arrangements. However, any fastening means or mechanisms that accommodate adjustability and otherwise meet the requirements of material handling applications could be alternatively used.

In addition, principle components of the carrier such as the carbody, propel frames, rims, and various parts of the drive assemblies are made from steel or other suitable material. The material to form these as well as other parts of the invention should meet the requirements of material handling applications.

Adjustability has great advantages in that the carrier can be used without outriggers. For example, the set-up time to pick material is decreased. In this regard, there is no need to check for clearance or solid ground before lowering the outriggers because outriggers are not required. Moreover, positioning of the carrier prior to picking is simplified. Consequently, speed of operation is increased.

Moreover, when the carrier is being used in an expanded state in material handling applications, the preferred embodiment allows for uniform lifting capabilities and improved maneuverability. Also, the load that is transferred through the upper to the carrier is distributed to six wide tires instead of four narrow outriggers. Thus, less ground pressure is created.

Figure 13:
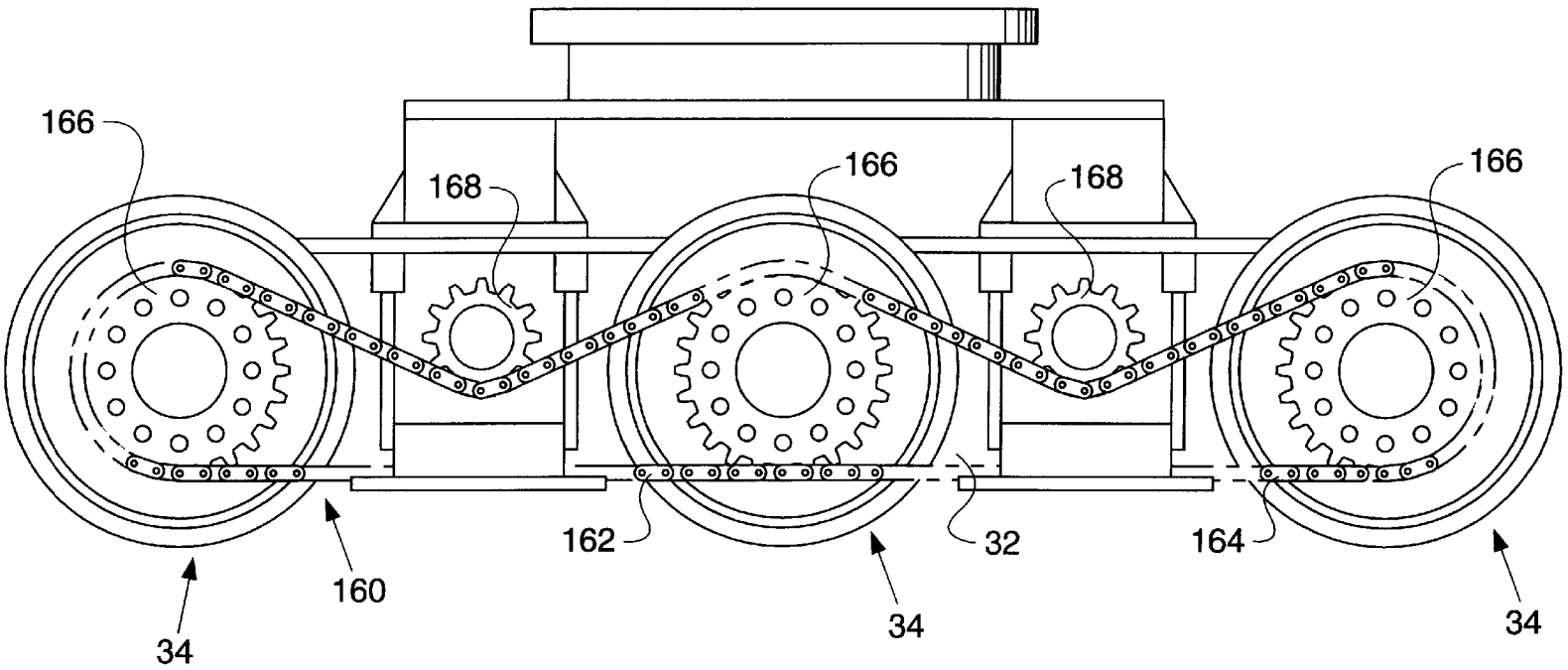
FIG. 13 is a side view of the carrier of FIG. 2 including a chain drive assembly connecting the wheel and drive assemblies of the present invention.

FIG. 13 illustrates a further embodiment of the present invention. As shown, the wheel and drive assemblies 34 are provided with chain drive assemblies 160 to enhance overall performance of the carrier. More specifically, the connection of the wheel and drive assemblies of each frame by an assembly 160 allows for a distribution of full power generated by the sum of the drive assemblies to at least one of the tire assemblies if any of the other tire assemblies becomes elevated off the ground. This feature is useful when the material handler travels over pot holes, rocks, mounds, etc. to retain full drive power.

The assemblies 160 include chains 162 and 164 connecting the wheel and drive assemblies 34 by sprockets 166 positioned on the wheel and drive assemblies 34. Sprockets 168 are positioned on the frames 32 to facilitate smooth travel of the chains and also to suitably tension the chains.

Figure 14:
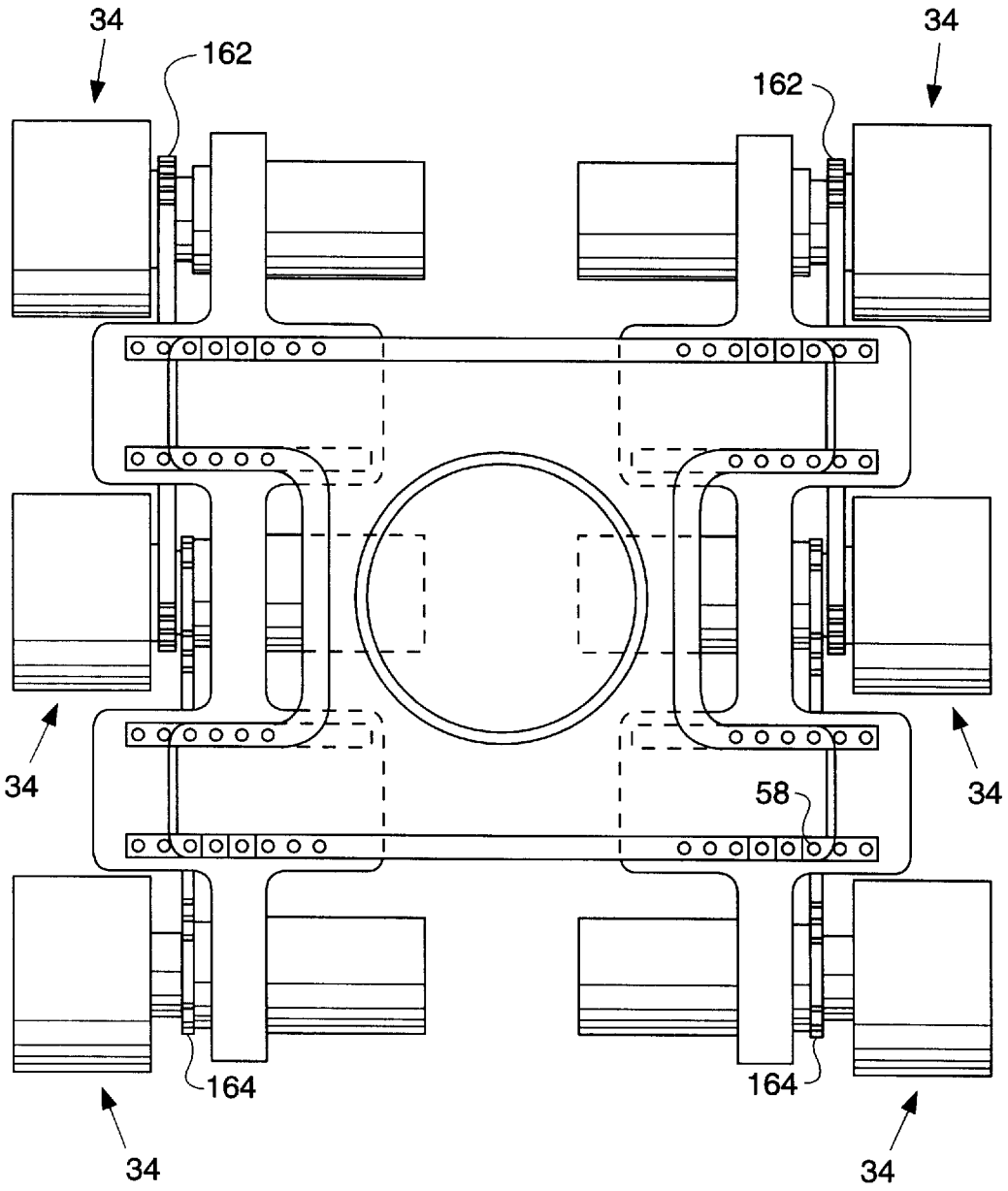
FIG. 14 is a top view of the carrier of FIG. 13.
Figure 15:
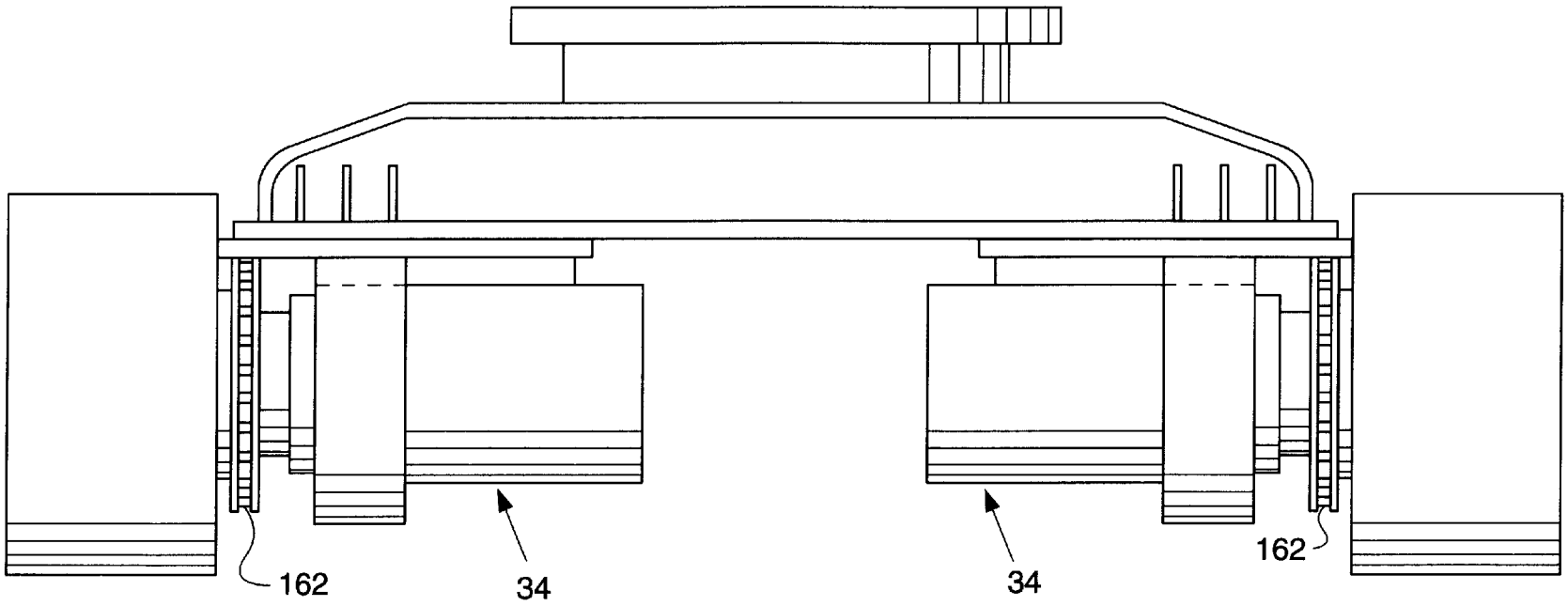
FIG. 15 is a front view of the carrier of FIG. 13.
Figure 16:
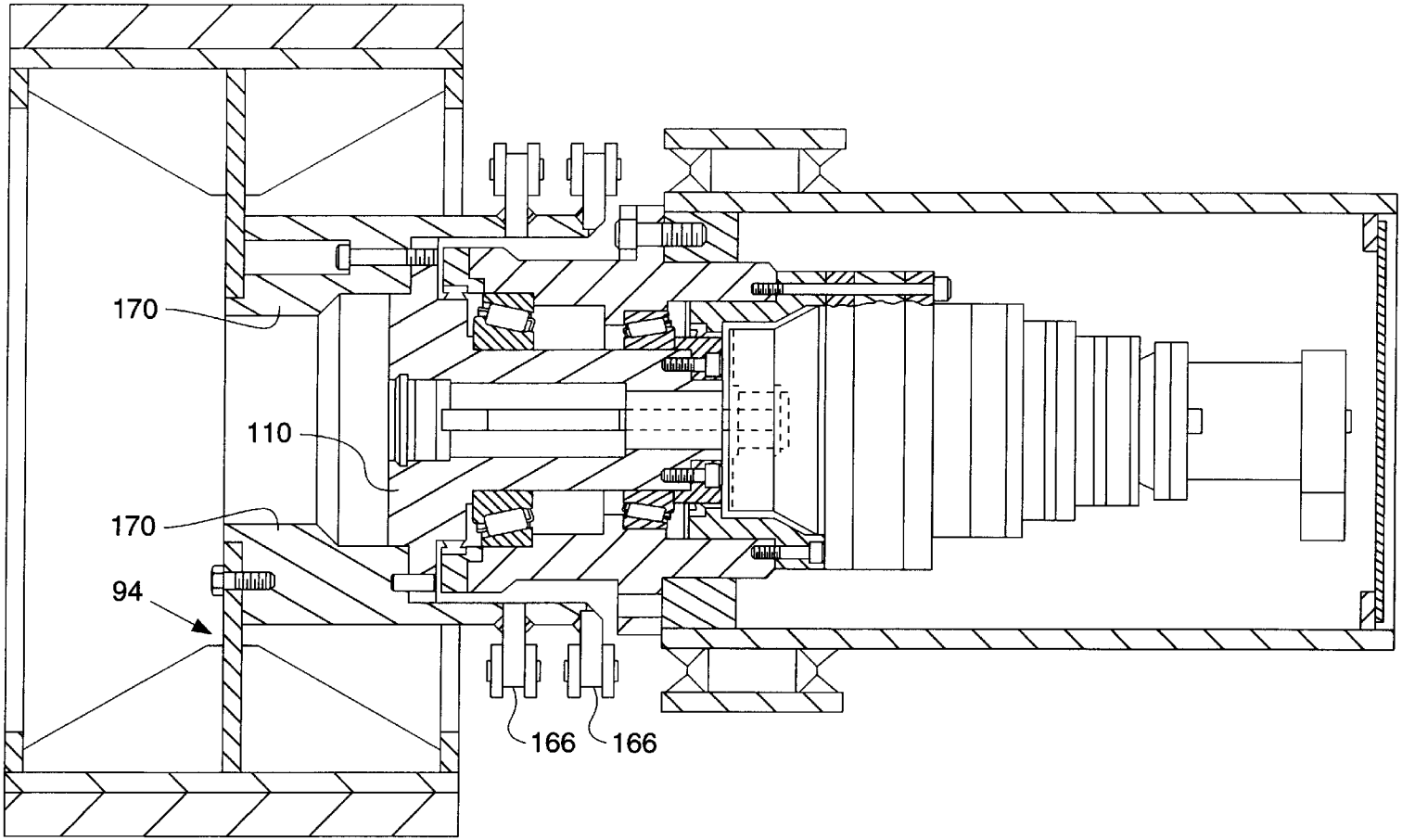
FIG. 16 is a cross-sectional view of a wheel and drive assembly of the carrier of FIG. 13.

FIGS. 14 and 15 show that each side of the carrier is provided with the chain drive assemblies 160. Also shown in FIG. 14 is the arrangement whereby, because two chains 162 and 164 are provided to each side of the carrier, the wheel and drive assembly positioned in the middle on each side must accommodate both chains. Accordingly, as shown in FIGS. 14 and 16, two sprockets 166 are provided and suitably positioned. FIG. 16 further illustrates the adaption of the wheel and drive assemblies to accommodate the sprockets. As shown, a cylindrical member 170 extends between the rim 94 and the hub 110 and supports the sprockets.

Figure 17:
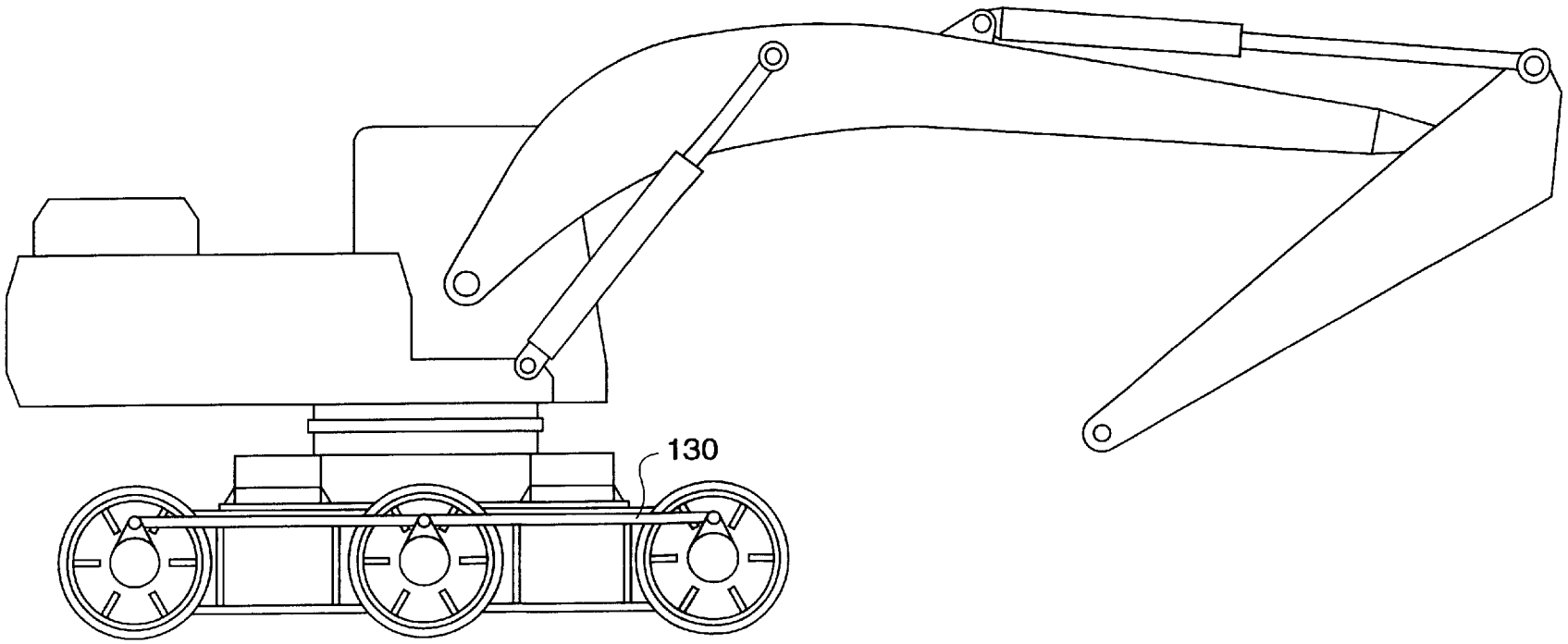
FIG. 17 is a side view of the material handling system of FIG. 1 including a mechanical link assembly connecting the wheel and drive assemblies of the invention.

Referring now to FIG. 17, a mechanical link assembly 130 is alternatively provided to connect all of the wheel and drive assemblies that are associated with a particular propel frame. Just as with the chain drive assemblies discussed above, the connection of the wheel and drive assemblies of each frame by an assembly 130 allows for a distribution of full power generated by the sum of the drive assemblies to at least one of the tire assemblies if any of the other tire assemblies becomes elevated off the ground.

Figure 18A:
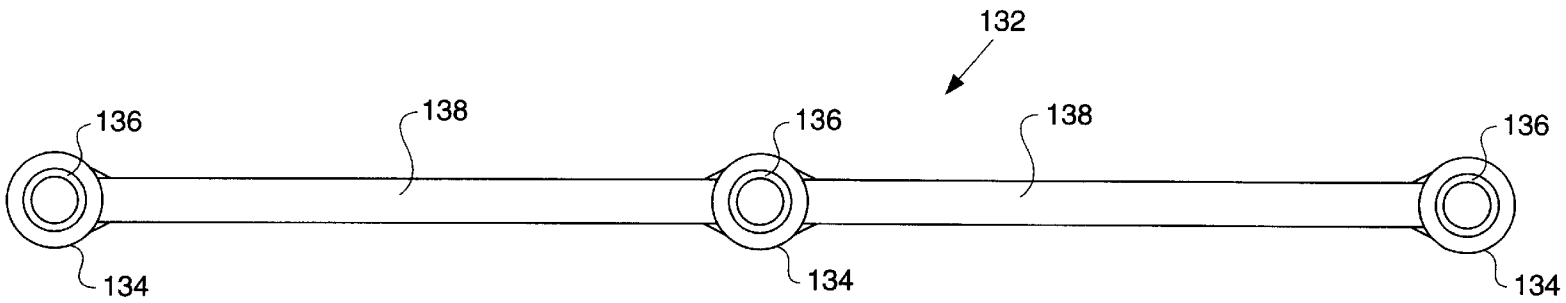
FIGS. 18(*a*) and (*b*) illustrate a link of the mechanical link assembly of FIG. 17.
Figure 18B:
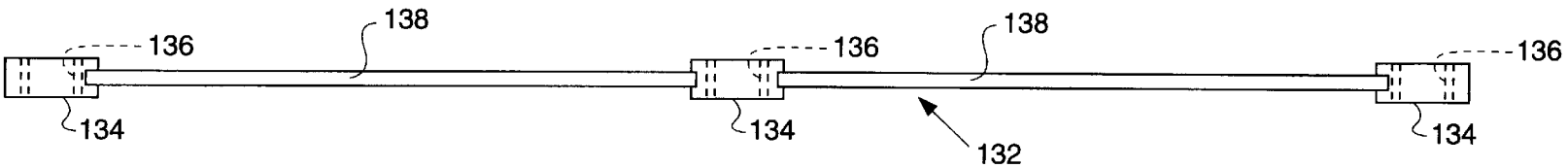
Figure 19B:
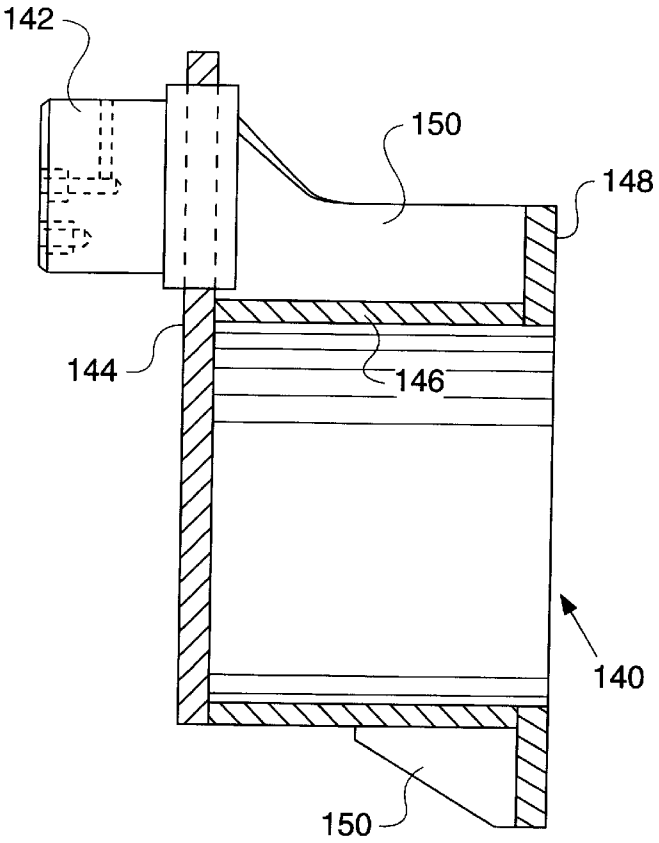
FIGS. 19(*a*) and (*b*) illustrate a rim adaptor of the mechanical link assembly of FIG. 17.
Figure 19A:
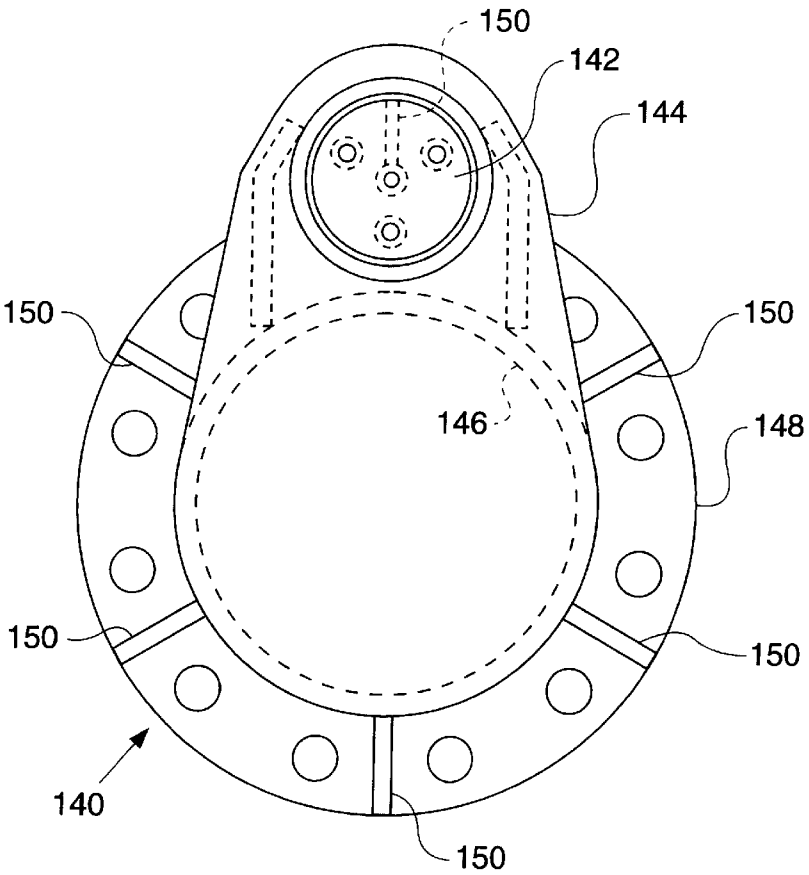

FIGS. 18(*a*)–19(*b*) illustrate the principle components of the mechanical link assembly 130. As shown in FIGS. 18(*a*) and (*b*), a link 132 comprises eyelets 134 having disposed therein cylindrical bushings 136. The eyelets 134 are generally cylindrical and are connected by members 138. The eyelets 134 and bushings 136 are sized to mate with the rim adapters which are connected to the rims 94, one such adaptor 140 being represented in FIGS. 19(*a*) and (*b*).

As shown, the adaptor 140 includes a pin 142 that is attached to one end of a camming member 144. The camming member 144 is attached at its other end to a cylindrical member 146 that is connected to a circular plate member 148. Reinforcing ribs 150 are also provided.

As those of ordinary skill in the art will appreciate, adaptors 140 are provided to each rim 94 and secured thereto. The link 132 is then connected to the adaptors that are provided to the rims of a particular propel frame by way of aligning and mating the eyelets 134 with the pins 142. It should be recognized that the pins must be aligned collinearly, as shown in FIG. 17, and that the bushings 136 facilitate relative rotation between the pins 142 and eyelets 134 when the tires are driven.

The above description merely provides a disclosure of particular embodiments of the invention and is not intended for the purposes of limiting the same thereto. As such, the invention is not limited to only the above described embodiments. Rather, it is recognized that one skilled in the art could conceive alternative embodiments that fall within the scope of the invention.

Having thus described the invention, we claim:

1. A rubber tired carrier adaptable for use with material handling equipment, the carrier comprising;

a main body;

a first frame adjustably connected to the main body;

a second frame adjustably connected to the main body;

a first wheel assembly set directly rotatably mounted to a first drive assembly set directly mounted on the first frame; and, a second wheel assembly set directly rotatably mounted to a second drive assembly set directly mounted on the second frame, whereby the first and second drive assembly sets are adjustable relative to one another to effectively expand or narrow an overall width of the carrier.

2. The carrier as set forth in claim 1 wherein the main body has first apertures formed therein and the first and second frames have second apertures formed therein corresponding to the first apertures, the carrier having fasteners extending through selected first and second apertures to respectively connect the main body to the first and second frames.

3. The carrier as set forth in claim 1 wherein the first wheel assembly set includes three tire assemblies having rims and the second wheel assembly set includes three tire assemblies having rims.

4. The carrier as set forth in claim 1, wherein the wheel assemblies include a rim and a flexible material formed around the rim, the rim including a circular rim plate having a rim aperture formed therein for accommodating a hub, a rim cylinder having the rim plate positioned therein and generally triangular gussets extending from the rim cylinder to the rim plate.

5. The carrier as set forth in claim 1 further comprising a chain drive assembly to link elements of the first and second wheel assembly and drive assembly sets.

6. The carrier as set forth in claim 1, wherein the drive assemblies include a hub rotatably mounted within a wheel housing, a gear case connected to the wheel housing through a gear case adapter, a hydraulic motor connected to the gear case and a stub shaft connecting the gear case to the hub.

7. A carrier adaptable for use with material handling equipment, the carrier comprising;

a main body having first apertures formed on a first side thereof and second apertures formed on a second side thereof;

a first frame having third apertures formed therein wherein the first frame is adjustably connected to the first side of the main body, first fasteners being positioned through aligned first and third apertures;

a second frame having fourth apertures formed therein wherein the second frame is adjustably connected to the second side of the main body, second fasteners being positioned through aligned second and fourth apertures;

a first wheel assembly set directly rotatably mounted to a first drive assembly set directly mounted on the first frame;

a first means for connecting the first wheel and drive assemblies;

a second wheel assembly set directly rotatably mounted to a second drive assembly set directly mounted on the second frame; and a second means for connecting the second wheel and drive assemblies;

whereby the first and second drive assembly sets are adjustable relative to one another to effectively expand or narrow an overall width of the carrier.

8. The carrier as set forth in claim 7 wherein the first and second wheel assembly and drive assembly sets incorporate skid steering principles.

9. The carrier as set forth in claim 7 wherein the carrier has a generally square configuration when the overall width of the carrier is expanded.

10. The carrier as set forth in claim 7 wherein the first and second wheel assemblies of the first and second drive assembly sets are rubber material mounted on rims.

11. The carrier as set forth in claim 7, wherein the wheel assemblies include a rim and a flexible material formed around the rim, the rim including a circular rim plate having a rim aperture formed therein for accommodating a hub, a rim cylinder having the rim plate positioned therein and generally triangular gussets extending from the rim cylinder to the rim plate.

12. The carrier as set forth in claim 7, wherein the drive assemblies include a hub rotatably mounted within a wheel housing, a gear case connected to the wheel housing through a gear case adapter, a hydraulic motor connected to the gear case and a stub shaft connecting the gear case to the hub.

13. A material handler comprising;

an upper having an extension for handling material; and a carrier supporting the upper, the carrier including;

a main body;

a first frame adjustably connected to the main body;

a second frame adjustably connected to the main body;

a first wheel assembly set directly rotatably mounted to a first drive assembly set directly mounted on the first frame; and, a second wheel assembly set directly rotatably mounted to a second drive assembly set directly mounted on the second frame, whereby the first and second drive assembly sets are adjustable relative to one another to effectively expand or narrow an overall width of the carrier.

14. The carrier as set forth in claim 13, wherein the wheel assemblies include a rim and a flexible material formed around the rim, the rim including a circular rim plate having a rim aperture formed therein for accommodating a hub, a rim cylinder having the rim plate positioned therein and generally triangular gussets extending from the rim cylinder to the rim plate.

15. The carrier as set forth in claim 13, wherein the drive assemblies include a hub rotatably mounted within a wheel housing, a gear case connected to the wheel housing through a gear case adapter, a hydraulic motor connected to the gear case and a stub shaft connecting the gear case to the hub.

* * * * *